May 19, 1959 A. F. HENNIES, JR 2,886,933
PRESS APPARATUS FOR ENGAGING A CONTAINER WITH A COVER
Filed Oct. 3, 1955 9 Sheets-Sheet 2

INVENTOR
AUGUST FRED HENNIES, JR.
BY Mead, Browne, Schuyler
& Beveridge
ATTORNEYS May 19, 1959　　　A. F. HENNIES, JR　　　2,886,933
PRESS APPARATUS FOR ENGAGING A CONTAINER WITH A COVER
Filed Oct. 3, 1955　　　9 Sheets-Sheet 3

INVENTOR
AUGUST FRED HENNIES, JR.
BY Mead, Browne, Schuyler
& Beveridge
ATTORNEYS May 19, 1959     A. F. HENNIES, JR     2,886,933
PRESS APPARATUS FOR ENGAGING A CONTAINER WITH A COVER
Filed Oct. 3, 1955     9 Sheets-Sheet 4
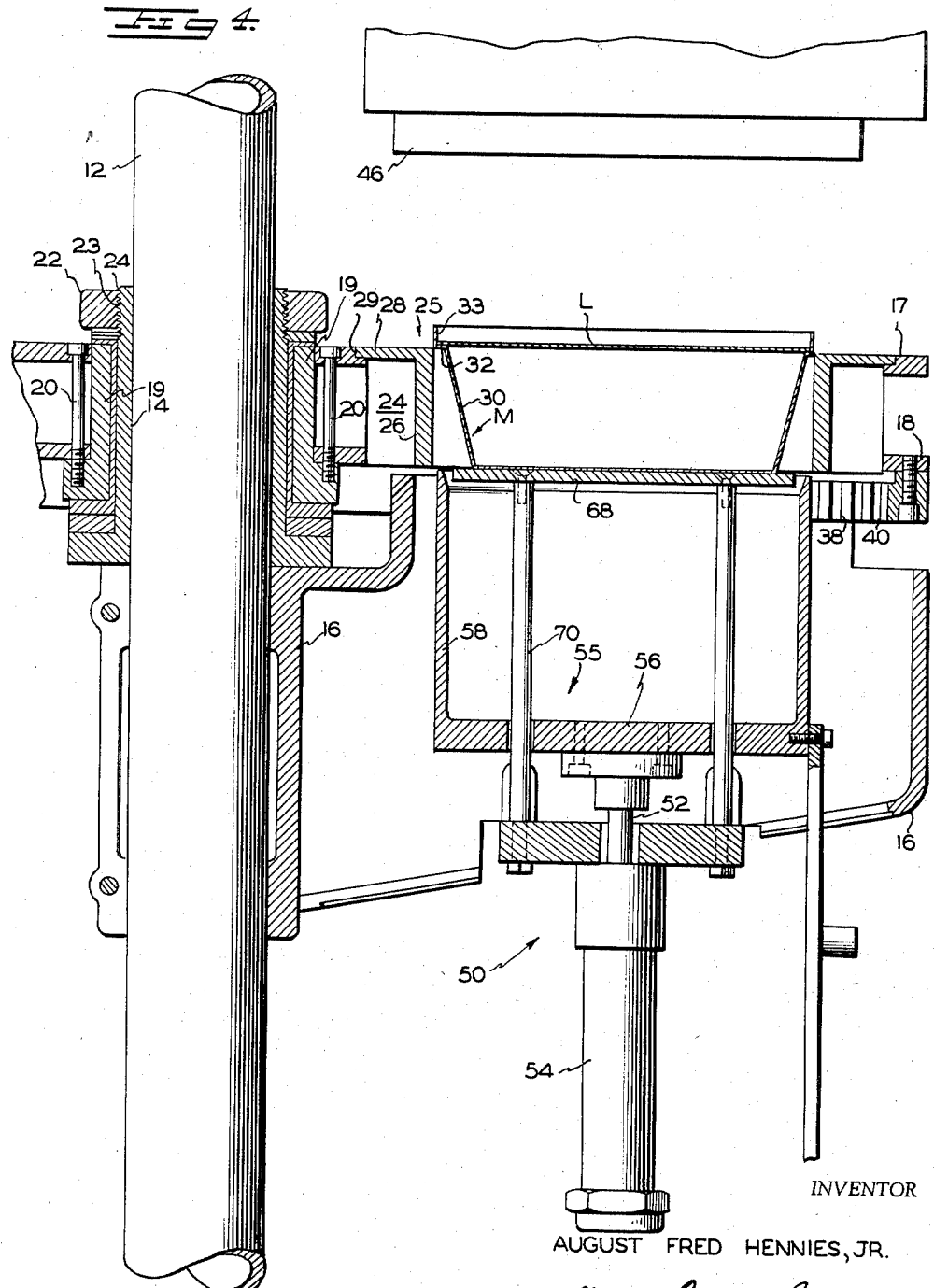
INVENTOR
AUGUST FRED HENNIES, JR.
BY Mead, Browne, Schuyler & Beveridge
ATTORNEYS

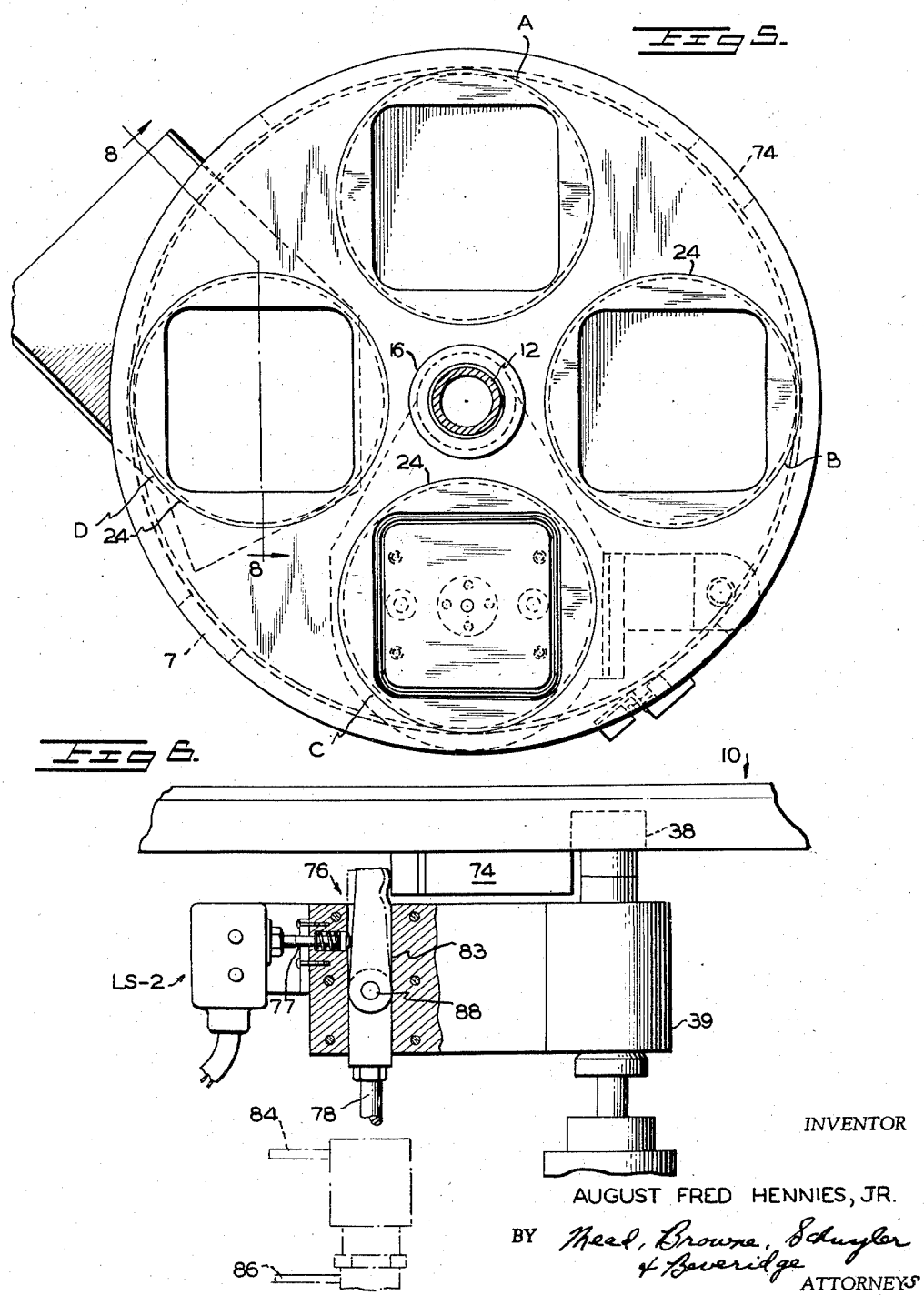

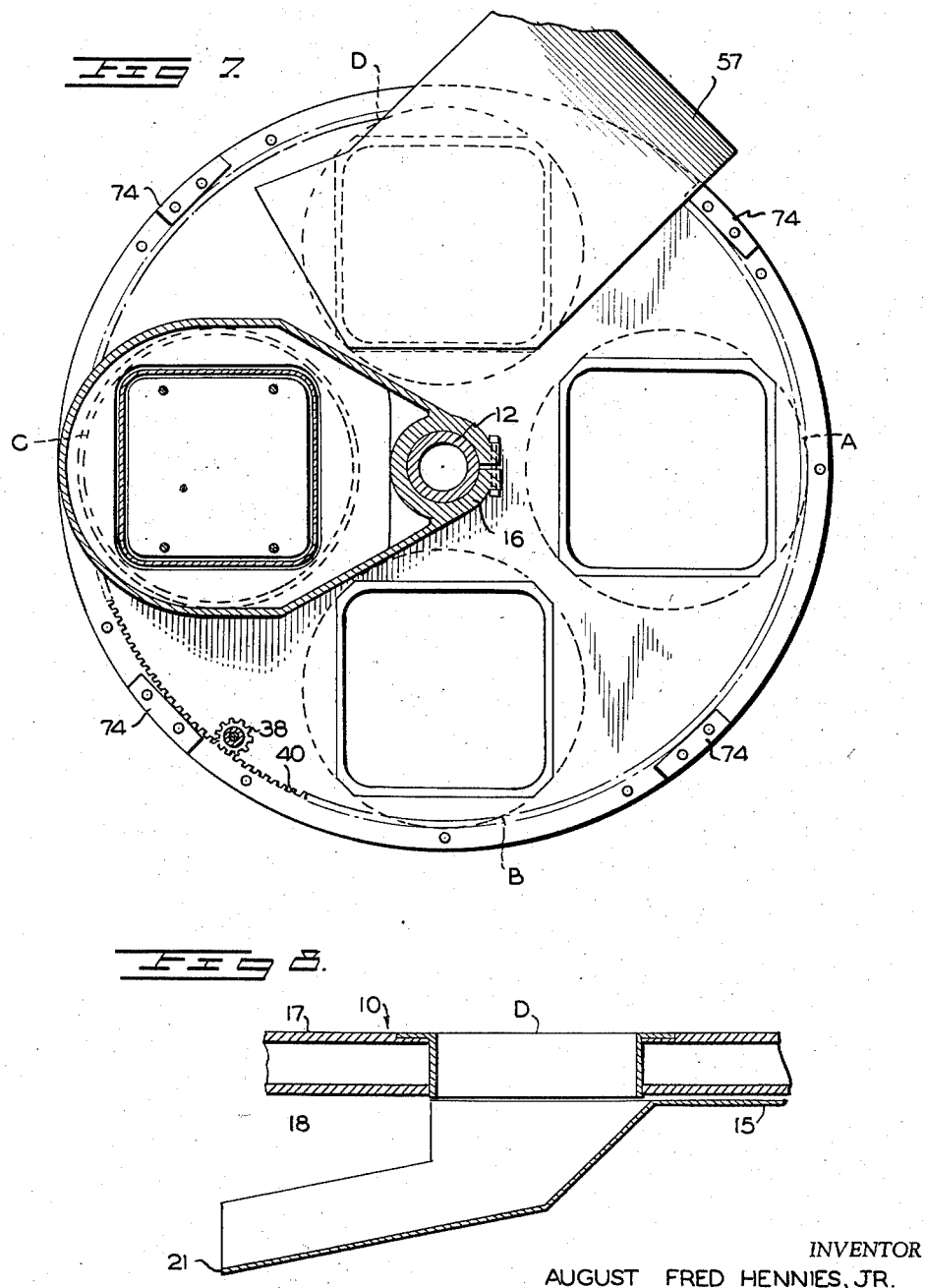

May 19, 1959 A. F. HENNIES, JR 2,886,933
PRESS APPARATUS FOR ENGAGING A CONTAINER WITH A COVER
Filed Oct. 3, 1955 9 Sheets-Sheet 7
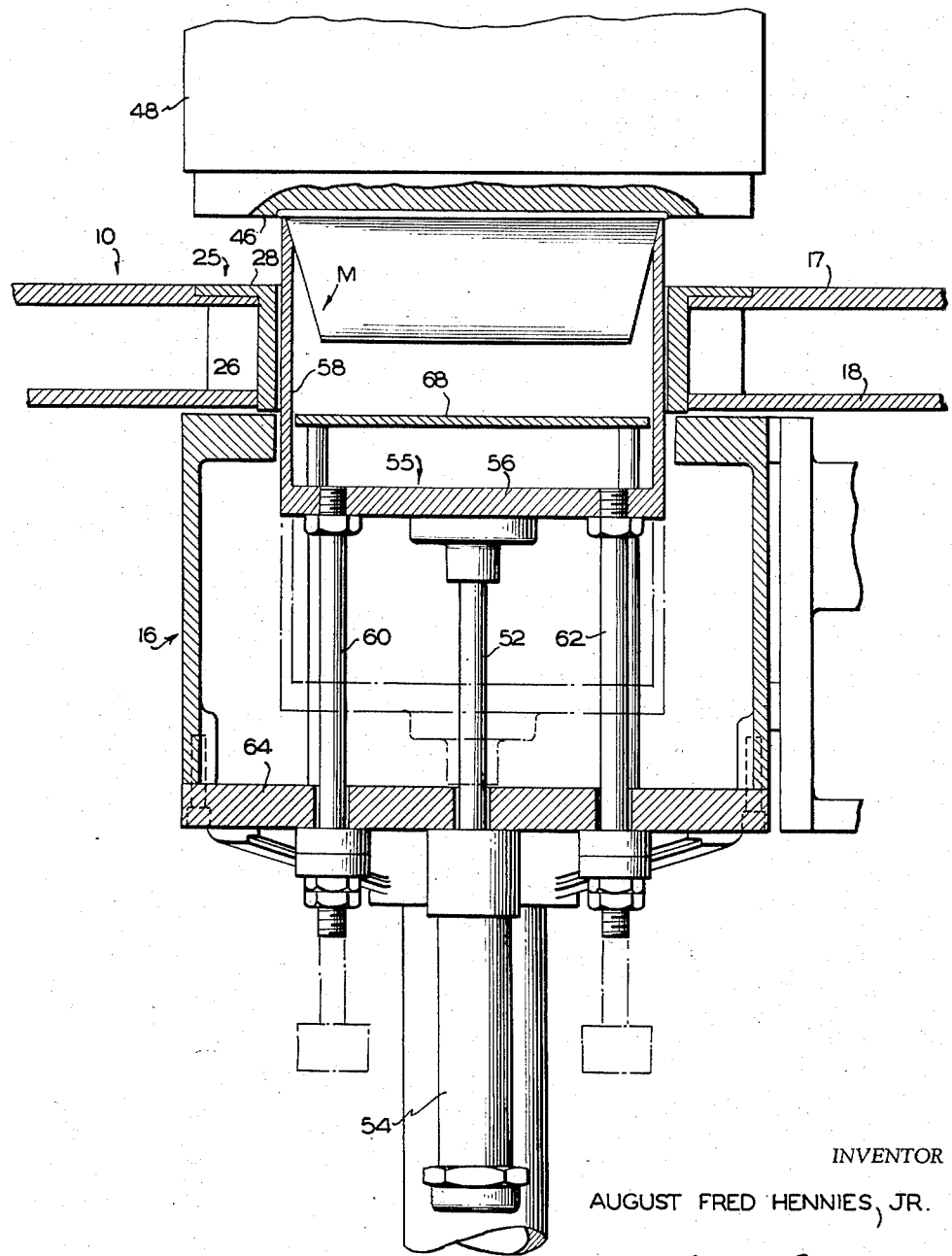
INVENTOR
AUGUST FRED HENNIES, JR.
BY
ATTORNEYS

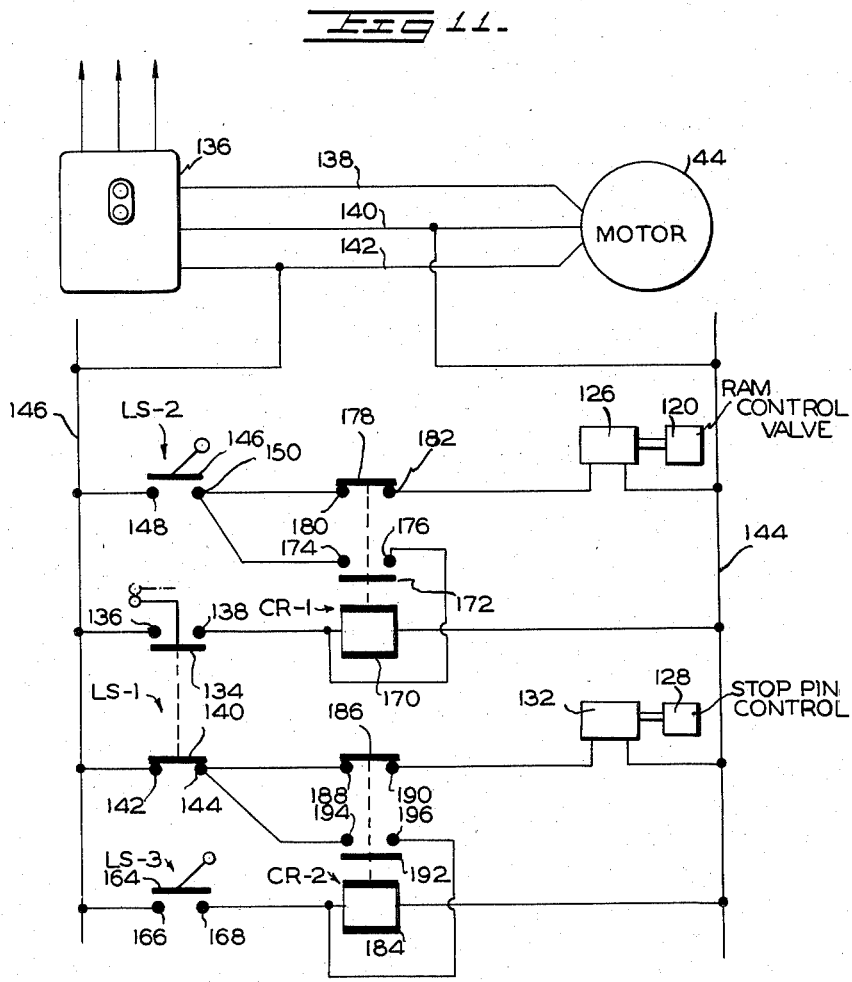

United States Patent Office 2,886,933
Patented May 19, 1959

2,886,933
PRESS APPARATUS FOR ENGAGING A CONTAINER WITH A COVER

August Fred Hennies, Jr., Louisville, Ky., assignor, by mesne assignments, to Cochran Continental Container Corporation, a corporation of Delaware Application October 3, 1955, Serial No. 538,095

9 Claims. (Cl. 53—341)

This invention relates to presses and more particularly to a press for pressing or crimping a container into closed engagement with a detachable cover of the container.

In the food packaging industry, many products, such as popcorn and the like, are packaged in pan-like containers which are closed after the container has been filled, by a cover member which is suitably engaged with the upper periphery of the pan-like container. Such containers are frequently made of metal foil, such as aluminum foil, while the covers are often made of a different material, such as cardboard. The container and the cover may be interlocked by providing the container with a horizontal peripheral lip on which the cover may seat, and with a vertical flange on the lip which may be crimped over the peripheral edge of the cover in overlapped relation thereto.

It is an object of this invention to provide an automatic apparatus for crimping the upper end of a container into engagement with a detachable cover of the container.

It is another object of this invention to provide an automatic crimping apparatus for securing a cover to a container which is capable of efficient and high speed operation.

It is still a further object of this invention to provide an apparatus which rotatably indexes successive filled pan-like containers into alignment with a ram and die mechanism which crimps a vertical flange on the container into overlapped engagement with the peripheral edge of the container cover.

In achievement of these objectives, an embodiment of this invention includes a rotatable turret having a plurality of pocket-like openings each adapted to receive a container, the containers being supported upon a table positioned underneath the turret. This turret is driven with an intermittent rotary indexing motion by a hydraulic motor to move successive pockets of the turret past a loading station where containers are placed in the pockets, and then to a crimping station where successive pockets are vertically aligned with a die member above the turret and a ram member below the turret. As it approaches the crimping station the turret is automatically decelerated by a control circuit which restricts the passage of hydraulic fluid to the hydraulic motor driving the turret. At the crimping station the turret is brought to a stop and the ram member is moved upwardly through an aperture in the table and through a pocket of the turret to raise the container therein into engagement with the die. The ram is then lowered and the container with a cover crimped on it is moved by the turret to a discharge station, where the container passes through a discharge opening in the table to a suitable receiving means, such as a conveyor.

Further objects and advantages of the invention will become apparent from the following description taken in conjunction with the accompanying drawings in which:

Fig. 4 is a view in vertical section along the line 4—4 of Fig. 1 showing details of the crimping station including the vertically movable plunger mechanism;

Fig. 5 is a view in horizontal section along lines 5—5 of Fig. 1;

Fig. 6 is an enlarged fragmentary vertical elevation view illustrating the details of the construction of the stop pin;

Fig. 7 is a view in horizontal section along line 7—7 of Fig. 2 illustrating the gear drive arrangement of the apparatus;

Fig. 8 is a view in vertical section along line 8—8 of Fig. 5 illustrating the details of the delivery chute;

Fig. 9 is a view in vertical section along line 9—9 of Fig. 3 showing the plunger mechanism in raised position at the crimping station;

Fig. 11 is a schematic diagram of the electrical circuits of the apparatus.

Figure 1:
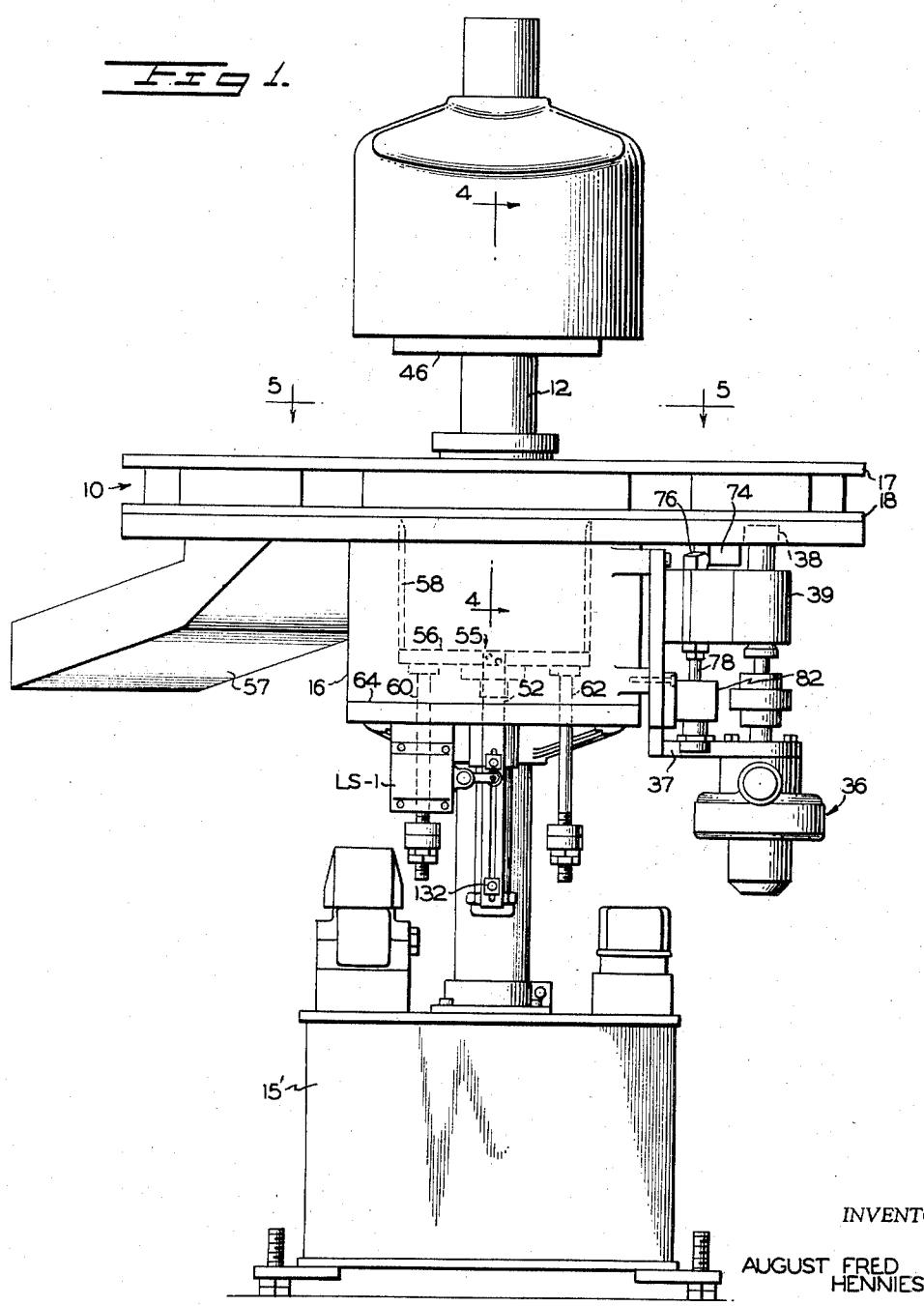
Fig. 1 is a front elevation view of an apparatus in accordance with the invention.
Figure 2:
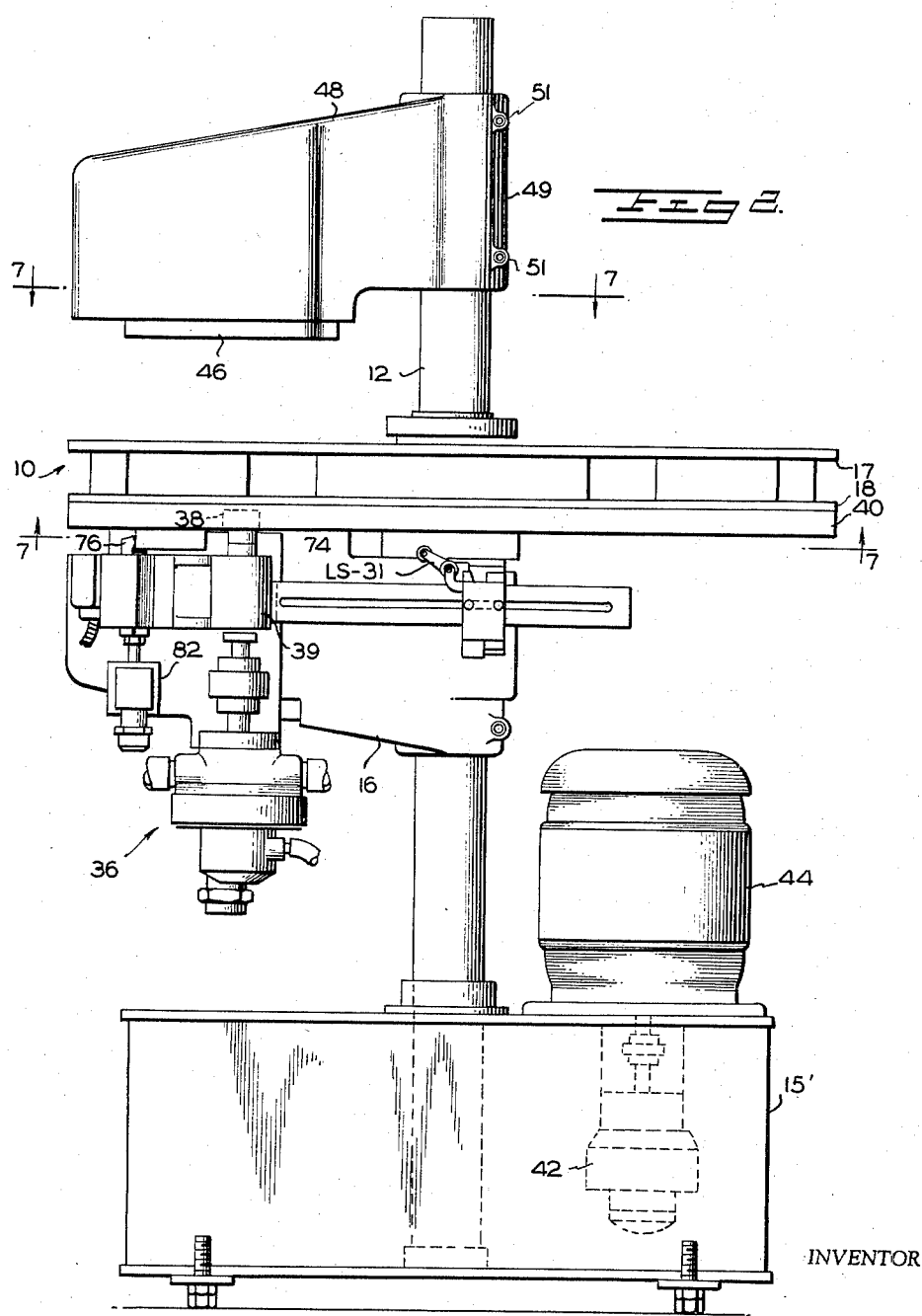
Fig. 2 is a side elevation view looking from the right of Fig. 1.
Figure 3:
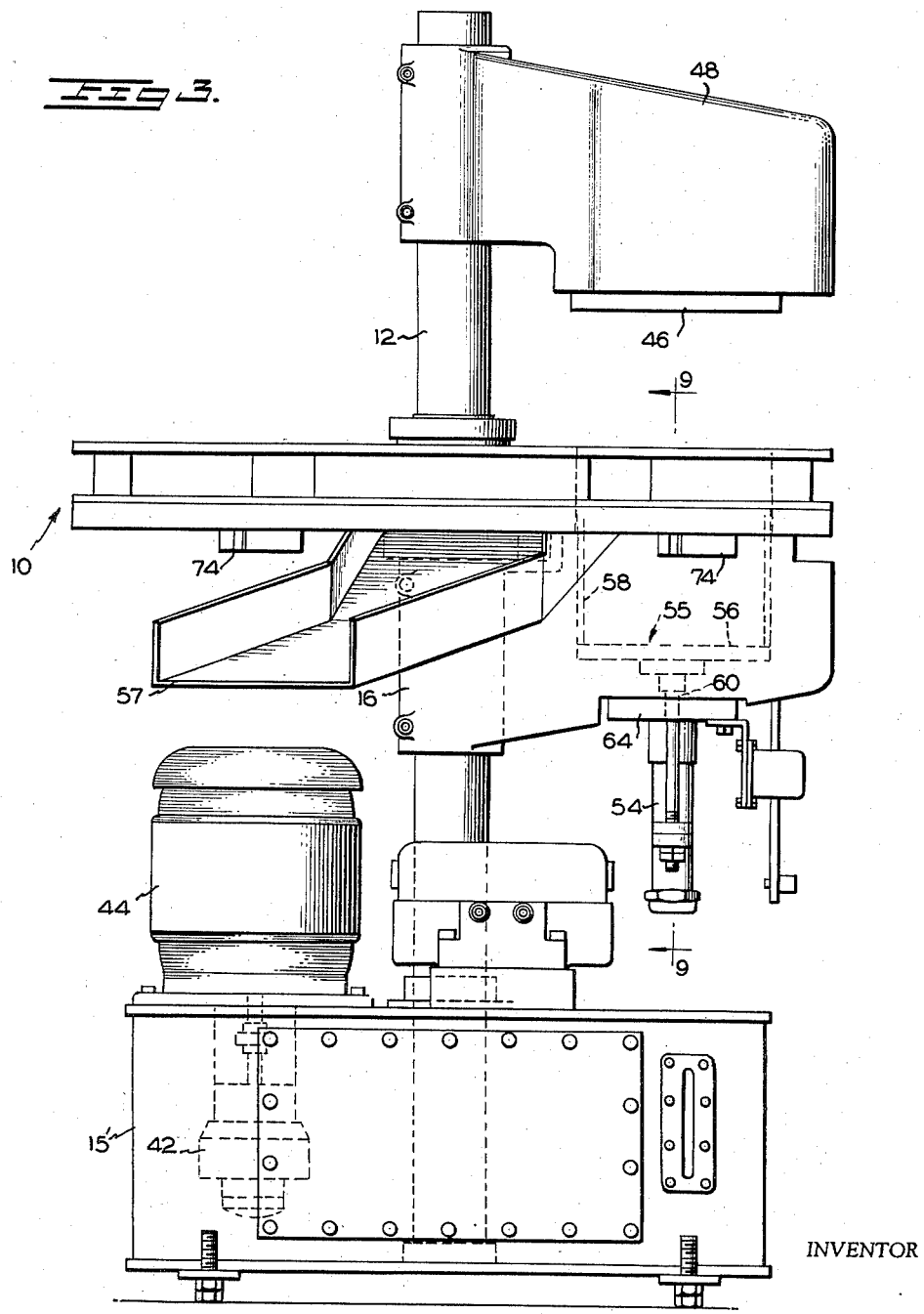
Fig. 3 is a side elevation view of the apparatus looking from the left of Fig. 1.

Referring now to the drawings, and more particularly to Figs. 1–4, inclusive, the crimping apparatus of the invention includes a rotatable turret generally indicated at 10 supported by a sleeve bearing 14 for rotation in a horizontal plane about a vertical column 12 supported by a base 15. As best seen in Fig. 4, sleeve bearing 14 is supported coaxially of and intermediate the height of column 12 by bracket member 16 which is rigidly secured to column 12 below the level of bearing 14.

Turret 10 is formed of a pair of vertically spaced disks 17 and 18 connected to a central hub 19 by bolts 20. Hub 19 is supported for rotation by bearing 14. Turret 10 is restrained from movement in an upward vertical direction by a nut 22 which is in screw threaded engagement with the threaded upper portion 23 of bearing 14.

Turret 10 is provided with four circumferentially spaced circular apertures or pockets 24, each pocket being defined by aligned openings in both upper and lower disks 17 and 18 to receive a container and to permit passage of a ram upwardly through the turret at the crimping station, as will be described.

In each aperture or pocket 24, there is supported an insert generally indicated at 25 (Fig. 4) having an opening conforming to the outer periphery of the container which is to be crimped. The machine in the embodiment shown is for closing containers having a rectangular periphery and a rectangular cover so each insert 25 has a rectangular cross section defined by a vertical wall 26. A circular horizontal flange 28 at the upper end of vertical wall 26 seats in a recess 29 of upper disk member 17 of the turret.

The four apertures 24 of the turret are successively indexed in a clockwise direction with respect to the views shown in the drawings, and as best seen in Figs. 5 and 7, past a loading station at position A or B, past a crimping station at position C and past a discharge station at position D. The containers to be crimped are loaded into successive pockets 24 at either position A or B. The container in pocket 24 at crimping station C is crimped by a hydraulically operated ram and die mechanism to be described. The container in the pocket 24 at the discharge station D is discharged by a delivery chute to a conveyor other suitable receiving device.

The container M which is to be crimped is best seen in Fig. 4 and includes an inclined vertical wall 30 having a horizontal peripheral lip 32 at its upper end to receive cover L and terminating in a vertical flange portion 33.

During the crimping operation, the vertical flange portion 33 of the container is bent over so as to lie in overlapped relation to the outer peripheral edge of cover L.

A horizontal table 15, best seen in Fig. 8, is supported by bracket 16 on column 12 closely adjacent the underneath surface of turret 10 so as to underlie the pockets 24 in positions A and B to thereby support containers M in these pockets. Table 15 is suitably apertured at position C to permit upward vertical movement of a ram device which elevates the container into engagement with a crimping die. At delivery position D, the table 15 is inclined downwardly, as best seen in Fig. 8, to form a discharge chute 21 which delivers the crimped containers to a suitable receiving means.

Turret 10 is rotatably driven in a step-by-step indexing movement by a hydraulic motor generally indicated at 36 and mounted below turret 10 on an L-shapped support arm 37 attached to bracket 16. Motor 36 drives a pinion member 38 which engages a ring gear 40 (Fig. 4) carried by the inner edge of the lower disk 18 of the turret. Hydraulic motor 36 is supplied with hydraulic fluid from a pump 42 driven by an electric motor 44. Motor 44 and pump 42 are mounted on base 15, the pump being positioned on the interior of base 15. Base 15 also serves as a tank which holds the hydraulic fluid used in the operation of the apparatus.

Secured to the upper end of column 12 above the level of turret 10 is a bracket 48 carrying a die member 46. Bracket 48 includes a split bushing 49 (Fig. 2) which is held in clamped engagement with column 12 by fastening means 51 to permit adjustment of the vertical position of die 46. A ram mechanism generally indicated at 50 and best seen in Figs. 4 and 9 is positioned in vertical alignment with die member 46 below turret 10 and constitutes an operating means for raising a filled container M with its cover or lid L in position into crimping engagement with die 46.

The ram mechanism generally indicated at 50 includes a piston rod 52 connected to a piston 53 which is vertically movable within a cylinder 54. Rigidly secured to piston rod 52 is a basket generally indicated at 55 including a horizontal bottom portion 56 having a shape conforming substantially to the internal contour of sleeve 25. A vertical wall 58 extends upwardly from the outer periphery of bottom portion 56, the periphery of the top edge of vertical wall 58 being the same as that of the horizontal lip 32 on contain M. When piston rod 52 is moved upwardly as shown in Fig. 9, the upper edge of wall 58 engages horizontal lip 32 of the container and lifts the container upwardly into engagement with die 46. A pair of spaced guide rod members 60 and 62, best seen in Fig. 9, lie on opopsite sides of piston rod 52 and are rigidly attached at their upper ends, as by a screw-threaded connection, to bottom portion 56 of basket 55. Piston rod 52 and guide rods 60 and 62 pass upwardly through passages in a horizontal stationary plate portion 64 carried by bracket 16.

To support container M at the crimping station, a fixed horizontal plate member 68 is supported in vertical alignment with die 46 and in substantially the same horizontal plane as table 15 by support rods 70, table 15 being apertured in the region of the crimping station to permit vertical movement of basket 55. Support rods 70 are rigidly attached at their lower ends to horizontal plate 64 supported by bracket 16. The horizontal bottom portion 56 of basket 55 is suitably apertured to permit vertical sliding movement of the basket along rods 70. The dimensions of the outer periphery of support plate 68 are sufficiently smaller than the corresponding dimensions of basket 55 to permit the basket to move upwardly around plate 68 from the retracted position shown in Fig. 4 to the elevated position shown in Fig. 9.

Turret 10 is rotatably indexed by the hydraulic drive motor 36 to move successive pockets 24 into alignment with die 46 and basket 55 at the crimping station. As each successive pocket 24 approaches the crimping station at position C, the turret is automatically decelerated by restricting the flow of hydraulic fluid to hydraulic motor 36 which drives the turret. The turret is then brought to a complete stop at the crimping station by engagement with a stop pin 76 located near the crimping station. The stop pin is moved upwardly into engagement with a stop block 74 carried by the turret.

Four stop blocks 74 are rigidly attached to turret 10 in equally circumferentially spaced relation beneath the lower edge of the lower disk 18 at the outer periphery thereof. Each of the stop blocks has a cam surface which is engageable with a limit switch LS-3 to cause deceleration of the turret as the turret approaches the stop pin 76. Limit switch LS-3 is placed in the path of the stop block 74 approaching stop pin 76 at a position sufficiently in advance of the stop pin to permit proper deceleration of the turret. The position of limit switch LS-3 is adjustable so that the necessary deceleration can be accomplished in the shortest possible space.

As will best be seen in Fig. 6, stop pin 76 is connected at its lower end to a piston rod 78 which is connected to a piston 80 inside hydraulic cylinder 82. Cylinder 82 is supported by L-shaped bracket arm 37 attached to bracket 16 (Fig. 1). Stop pin 76 is guided for vertical movement by a vertical passage 83 in a bearing bracket 39 attached to and extending laterally from bracket arm 37. Stop pin 76 is pivotally movable about pivotal axis 88 and into engagement with a limit switch LS-2 when the stop pin is engaged by stop block 74, as will be explained more fully in connection with the electrical control circuit. Limit switch LS-2 is supported adjacent stop pin 76 by bearing bracket 39.

*Hydraulic control system*

Figure 10:
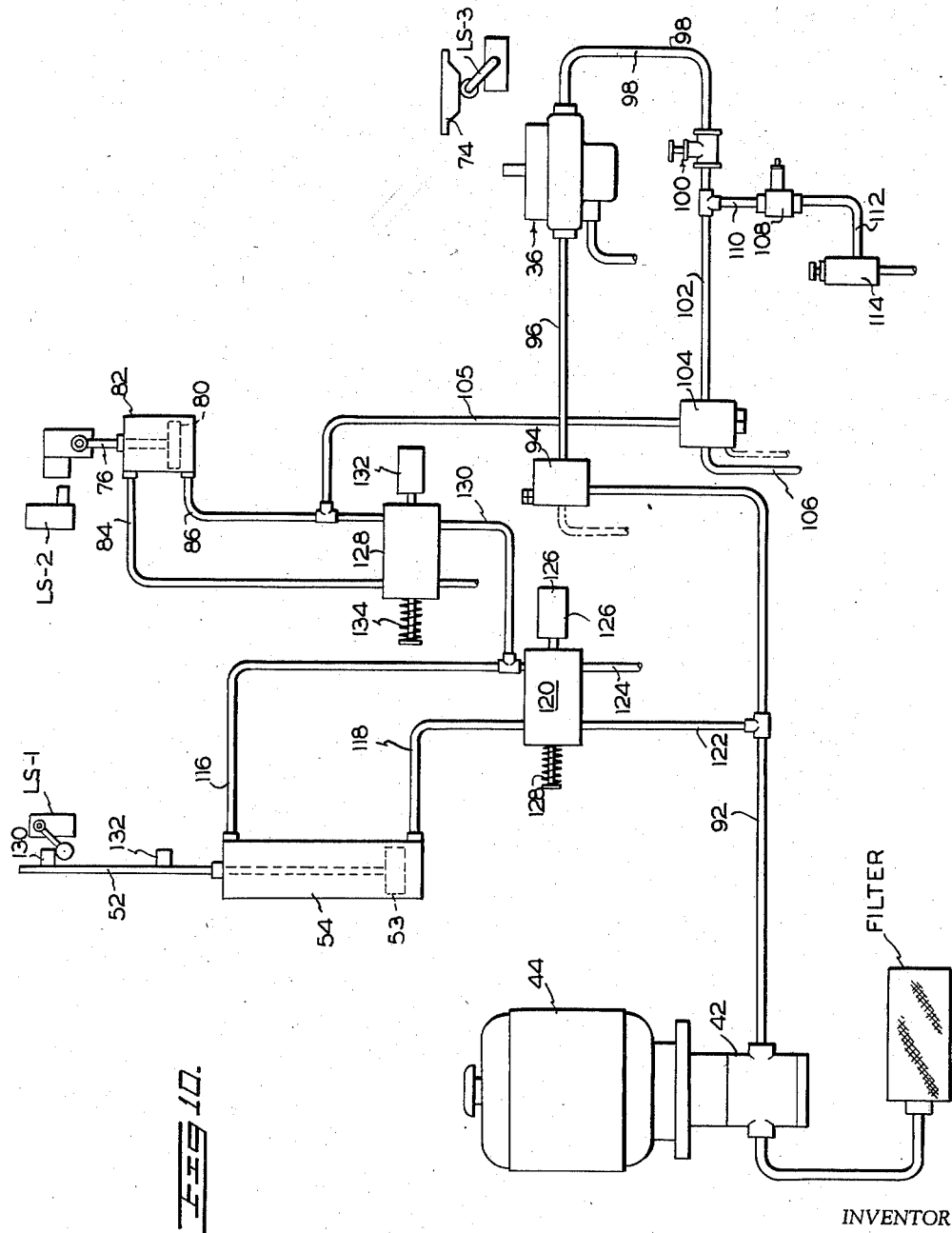
Fig. 10 is a schematic diagram of the hydraulic circuit of the apparatus.

Referring to the hydraulic control system shown in Fig. 10, it will be noted that the output of hydraulic pump 42 passes through conduit 92 to a by-pass valve 94 and thence by conduit 96 to the inlet of fluid motor 36 which drives index table 10. The output or exhaust port of fluid motor 36 is connected through conduit 98 to an adjustable needle valve 100. The exhaust fluid from fluid motor 36 passes through needle valve 100 and conduit 102 to a normally open two-way valve 104 connected through conduit 106 to the tank containing the hydraulic fluid. Two-way valve 104 is normally open, but is closed when pilot pressure is applied to the valve through conduit 105.

A needle valve 108 is connected in parallel relation with two-way valve 104 as an alternative path to the tank for the exhaust fluid from fluid motor 36. Needle valve 108 is connected by conduit 110 to conduit 102 and by conduit 112 to a back pressure valve 114 through which the hydraulic fluid passes to the sump or tank. Needle valve 108 and back pressure valve 114 provide a high resistance path which causes deceleration of fluid motor 36 when pilot pressure is applied through conduit 105 to close two-way valve 104. Normally, the hydraulic fluid passes through normally open two-way valve 104 to the tank rather than passing through needle valve 108 and back pressure valve 114.

The cylinder 54 which houses piston rod 52 of the ram device 50 is connected at its upper and lower ends, respectively, to conduits 116 and 118 which in turn are connected to control valve 120. Control valve 120 in turn is connected by conduit 122 to the output conduit 92 of pump 42 and by conduit 124 to exhaust or the tank containing the hydraulic fluid. When hydraulic fluid is supplied through conduit 116 and exhausted through conduit 118, the piston member 53 at the lower end of piston rod 52 is in a down position as shown in dotted outline in Fig. 10. On the other hand, when hydraulic fluid is admitted through conduit 118 and exhausted through conduit 116, piston rod 52 is moved to the upper end of cylinder 54.

Valve 120 includes a movable valve element actuated by an electric solenoid 126. The movable valve element of valve 120 is normally biased by a spring 128 to a position in which fluid is supplied to the upper end of cylinder 54 through conduit 116 and exhausted from the lower end of the cylinder through conduit 118 thereby causing piston 53 to move to the lower end of cylinder 54 as shown in Fig. 10. Thus, when solenoid 126 is de-energized, piston 53 is in the down position. However, when solenoid 126 is energized, the movable valve element of valve 120 moves against the biasing force of spring 128 and connects conduit 116 to the exhaust line. When this happens, piston 53 moves upwardly to the upper end of cylinder 54 causing basket 55 to move container M upwardly into engagement with die 46.

As seen in Fig. 10, piston rod 52 is provided adjacent its upper and lower portions externally of cylinder 54 with a pair of spaced abutments 130 and 132 which are engageable with double-pole, double-throw limit switch LS-1. Abutment 130 actuates limit switch LS-1 when piston rod 52 reaches the lower end of cylinder 54 while abutment 132 actuates limit switch LS-1 when piston rod 52 reaches the upper end of cylinder 54.

As previously mentioned, stop pin 76 is connected by piston rod 78 to a piston member 80 disposed within cylinder 82. Conduits 84 and 86 are connected to the upper and lower ends of cylinder 82 and to a control valve 128. Control valve 128 is connected to the source of fluid supply through conduit 130 which is connected to conduit 116 leading from valve 120. Thus, when valve 120 is in its normal position with solenoid 126 de-energized, hydraulic fluid is supplied from conduit 116 to conduit 130 and thus to valve 128. Valve 128 is controlled by an electrical solenoid 132 which moves the valve element against the force of biasing spring 134. With solenoid 132 de-energized, valve 128 is moved by biasing spring 134 to a position which maintains piston 80 of stop pin cylinder 82 in raised position. When solenoid 132 is energized, the movable valve element of valve 128 moves to a position in which hydraulic fluid is supplied through conduit 84 to the upper end of stop pin cylinder 82 to cause stop pin 76 to move downwardly.

*Electrical control system*

Referring now to Fig. 11, the electric motor 44 which drives pump 42 is energized through a starter box 136 over the three power conductors 138, 140 and 142 which supply three phase electrical power to motor 44. The electrical control system is energized from conductors 144 and 146 which are respectively connected to conductors 140 and 142. Thus, the control system is energized only when motor 44 is energized. The control system includes the solenoids 126 and 132 which have already been described and which respectively control valves 120 and 128 associated with the power ram mechanism and with the stop pin, respectively. The control system also includes limit switches LS-1, LS-2 and LS-3, respectively.

Limit switch LS-1 is a double-pole, double-throw switch which is actuated by the abutments 130 and 132 connected to the power ram piston rod 52. Switch LS-1 includes a normally open briding element 134 adapted to bridge contacts 136 and 138, and a normally closed second bridging element 140 which is adapted to bridge contacts 142 and 144. Limit switch LS-2 is a single-pole double-throw switch which is actuated when a stop block 74 engages pivotally movable stop pin 76. As best seen in Fig. 6, limit switch LS-2 includes an operating element 77 which is engaged by pivotally movable stop pin 76. Switch LS-2 includes a bridging element 146 which is movable into or out of bridging engagement with fixed contacts 148 and 150. Limit switch LS-3 is actuated by a cam surface on one of the stop blocks 74 as one of the container receiving pockets 24 approaches the crimping station, and includes a bridging element 164 which is adapted to bridge contacts 166 and 168.

The control circuit also includes a first relay generally indicated at CR-1 including an operating coil 170, a normally open contact 172 adapted to bridge fixed contacts 174 and 176, and a normally closed contact 178 adapted to bridge fixed contacts 180 and 182.

The electrical control circuit also includes a relay generally indicated at CR-2 having an operating coil 184, a normally closed contact 186 adapted to bridge fixed contacts 188 and 190, and a normally open contact 192 adapted to bridge fixed contacts 194 and 196.

Solenoid 126 associated with ram cylinder control valve 120 is connected to electrical power across power lines 144 and 146 in series with bridging contact 146 of limit switch LS-2 and in series with normally closed contact 178 of relay CR-1. Operating coil 170 of relay CR-1 is connected to electrical power across lines 144 and 146 in series with bridging contact 134 of limit switch LS-1. A holding circuit for relay CR-1 is provided through contact 172 and through limit switch LS-2 when limit switch LS-2 is in closed position. Solenoid 132 associated with control valve 128 for stop pin cylinder 82 is connected to electrical power in series with normally closed bridging contact 140 of limit switch LS-1 and in series with normally closed bridging contact 186 of relay CR-2. Operating coil 184 of relay CR-2 is connected to electrical power across power lines 144 and 146 in series with limit switch LS-3. A holding circuit is provided for relay CR-2 through contact 192 and through normally closed contact 140 of limit switch LS-1.

*Operation*

Filled containers M with covers L resting on the horizontal lips 32 of the respective containers are dispensed to the pockets 24 of turret 10 at either position A or B. The loading operation may be done manually or by a suitable loading mechanism.

In the de-energized state of the crimping apparatus, piston 53 attached to piston rod 52 of basket 55 is positioned at the lower end of cylinder 54. Also, stop pin 76 is in the raised position with its attached piston 80 being at the upper end of cylinder 82. The apparatus is started in operation by closing switch 136 of Fig. 11 to energize motor 44 which starts pump 42 in operation. Since normally closed contacts 140 and 186 are both in closed position at this time, solenoid 132 is energized and causes valve 128 to move to a position against the force of biasing spring 134 in which the hydraulic fluid passes through conduit 84 into the upper end of stop pin cylinder 82 and is exhausted from the lower end of that cylinder through conduit 86. This causes piston 80 to move downwardly in cylinder 82 to thereby lower stop pin 76 to permit turret 10 to rotate.

The hydraulic fluid passes from pump 42 through conduit 92, through by-pass valve 94, through conduit 96 to the inlet port of fluid motor 36, through fluid motor 36, through exhaust line 98, needle valve 100, conduit 102 and normally open two-way valve 104 to conduit 106 and thence back to the tank which contains the hydraulic fluid. Since the stop pin 76 is retracted and hydraulic fluid is being supplied to motor 36, motor 36 begins to turn at maximum speed to thereby rotate turret 10 through the engagement of pinion gear 38 with ring gear 40. The maximum speed of the fluid motor may be adjusted by adjustment of the needle valve 100.

After the turret has moved at maximum speed through a predetermined distance and the first container to be crimped is approaching the crimping station, a cam surface on the stop block 74 approaching the crimping station and carried by the underneath circumferential edge of turret 10 strikes limit switch LS-3 and closes the energization circuit of operating coil 184 of relay CR-2. Operating coil 184 of relay CR-2 remains energized even after stop block 74 has passed by and has released limit switch LS-3 due to the provision of a holding circuit which is closed by the bridging engagement of contact 192 with fixed contacts 194 and 196. This holding circuit connects one side of operating coil 184 to power line 146 in series with normally closed contact 140 of limit switch LS-1, the other side of coil 184 already being connected to power line 144.

Energization of relay operating coil 184 causes contact 186 to move out of bridging relation to fixed contacts 188 and 190 to thereby de-energize solenoid 132 associated with stop pin control valve 128 and permits spring 134 to move valve 128 to a position in which pressure fluid passes upwardly through conduit 86 to the lower end of stop pin cylinder 82. At the same time, the hydraulic pressure in conduit 86 is communicated through conduit 105 to two-way valve 104 which causes the two-way valve 104 to close. This closure of valve 104 causes the exhaust liquid from motor 36 passing through conduit 98 and needle valve 100 to be forced through the alternative path which includes needle valve 108 and back pressure valve 114. This alternative passage provides a much greater restriction of fluid flow than the normal path through valve 104 with the result that the rate of liquid flow through fluid motor 36 is greatly reduced due to the increased hydraulic resistance in the circuit of motor 36 provided by valves 108 and 114.

The reduced rate of fluid flow through motor 36 causes deceleration of motor 36 and consequently a deceleration of turret 10 driven by motor 36 so that stop block 74 contacts the raised stop pin 76 with greatly reduced force and with very little shock. The location of limit switch LS-3 can be adjusted to produce the necessary deceleration of the index table in the shortest possible space.

The turret is brought to a stop by the engagement of stop block 74 with stop pin 76 when the pocket 24 holding a container M which is to be next crimped reaches the crimping station and is in alignment with die 46. When stop block 74 engages stop pin 76, it pushes the pivotally movable stop pin into engagement with limit switch LS-2 mounted adjacent the stop pin. This causes contact 146 to bridge contacts 148 and 150 to thereby energize solenoid 126 associated with ram control valve 120. This moves valve 120 against the force of biasing spring 128 to a position in which hydraulic fluid is admitted to the lower end of cylinder 54 through conduit 118 and is exhausted from the upper end of cylinder 54 through conduit 116. This causes piston rod 52 of the ram mechanism to move basket 55 upwardly to raise container M into engagement with die 46, causing the vertical flange 33 of container M to be crimped into engagement with the cover L.

At the end of the upstroke of the cam devices, abutment 132 on piston rod 52 engages limit switch LS-1 and moves bridging contact 134 into engagement with fixed contacts 136 and 138 and moves bridging contact 140 out of engagement with fixed contacts 142 and 144. The opening of bridging contact 140 opens the holding circuit of relay CR-2 permitting normally closed contact CR-2 to reclose. The movement of contact 134 into engagement with fixed contacts 136 and 138 energizes operating coil 170 of relay CR-1. Energization of operating coil 170 causes contact 178 to move out of engagement with fixed contacts 180 and 182 to thereby deenergize solenoid 126 associated with ram control valve 120. Deenergization of solenoid 126 permits biasing spring 128 to move valve 120 back to the position in which the hydraulic fluid is fed into the upper end of cylinder 54 and exhausted from the lower end of that cylinder to thereby move the ram member downwardly.

At the end of the downstroke of ram piston rod 52, abutment 130 engages limit switch LS-1 and moves the limit switch back to its normal position in which contact 140 bridges contacts 142 and 144 to energize solenoid 132 of the stop pin control valve 128 and in which contact 134 is moved out of engagement with contacts 136 and 138 in the circuit of operating coil 170 of relay CR-1. Reclosure of contact 140 again energizes solenoid 132, since contact 186 is now closed, and moves valve 128 to a position in which stop pin 76 is moved downwardly. Downward movement of stop pin 76 releases limit switch LS-2 and permits the limit switch to re-open. Opening of limit switch LS-2 opens the holding circuit of relay CR-1 by de-energizing operating coil 170 of relay CR-1.

When solenoid 132 is energized by the actuation of limit switch LS-1 at the completion of the down stroke of ram piston rod 52, valve 128 moves to a position against biasing spring 134 in which hydraulic fluid is supplied to the upper end of stop pin cylinder 82 through conduit 84 and exhausted from the lower end of cylinder 82 through conduit 86, with the consequent movement of stop pin 76 downwardly as previously mentioned. The removal of pressure from conduit 86 also removes pressure from conduit 105 and thus permits valve 104 to re-open so that the full fluid flow from fluid motor 36 passes through the open valve 104 directly to the tank. Thus, the fluid motor 36 starts out at full torque and runs at maximum speed until limit switch LS-3 is actuated by the next block and the next decelerating, stopping and crimping cycle commences.

The cycle continues automatically until the electric motor 44 is shut off, with consequent de-energization of all valves and relays. This causes the piston rod 52 and basket 55 to go down and causes the stop pin 76 to go up as previously explained.

In conclusion, it can be seen that there is provided in accordance with this invention an automatic apparatus for engaging a pan-like container in interlocked engagement with a detachable cover for the container which is capable of high speed and efficient production. The apparatus is completely automatic in its operation and has the advantage that all of the hydraulic mechanism is disposed below the turret, thus eliminating any possibility of leakage of the hydraulic fluid onto the food in the containers which are being closed.

While there has been shown and described a particular embodiment of the invention, it will be obvious to those skilled in the art that various changes and modifications may be made therein without departing from the invention, and, therefore, it is aimed to cover all such changes and modifications as fall within the true spirit and scope of the invention.

What I claim as my invention is:

1. An apparatus for crimping an upstanding flange of a container into engagement with a cover seated on a horizontal peripheral lip of the container comprising a rotatable turret having a pocket-like aperture extending therethrough for receiving a container to be crimped, a crimping station including a stationary die member disposed above said turret and a hollow ram member shaped to engage the flange of a container in said aperture, said ram member being of smaller dimensions than said aperture and normally disposed below said turret in aligned relation with said die member, means for rotating said turret to move an aperture having a container positioned therein to said crimping station and into alignment with said die and ram members, means for stopping movement of said turret when said aperture is at said crimping station, and means for moving said ram member through said aperture to engage the flange of the container and raise the container into engagement with said die member and for lowering said ram member away from said die member and back to a position beneath said turret.

2. An apparatus for crimping an upstanding flange of a container into engagement with a cover seated on a horizontal peripheral lip of the container comprising a rotatable turret having a plurality of circumferentially spaced pocket-like apertures extending therethrough each of said apertures being adapted to receive a container to be crimped, a crimping station including a stationary die member disposed above said turret and a hollow ram member shaped to engage the flange of a container in said apertures, said ram member being of smaller dimensions than said apertures and normally disposed below said turret in aligned relation with said die member, means for rotatably indexing said turret to move successive apertures to said crimping station and into alignment with said die and ram members, means for stopping movement of said turret when an aperture is at said crimping station, and means for moving said ram member through an aperture of the turret at the crimping station to engage the flange of the container and raise the container into engagement with said die member and for lowering said ram member away from said die member and back to a position beneath said turret.

3. An apparatus for crimping an upstanding flange of a container into engagement with a cover seated on a horizontal peripheral lip of the container comprising a rotatable turret having a plurality of circumferentially spaced pocket-like apertures each adapted to receive a container to be crimped, a crimping station including a stationary die member disposed above said turret and a ram member disposed below said turret in aligned relation with said die member, drive means for rotatably indexing said turret to move successive apertures to said crimping station and into alignment with said die and ram members, a table positioned below said turret and adapted to support the bottom surface of containers in said apertures before said containers reach said crimping station, said table being formed with an opening at said crimping station through which said ram may move toward said die means for stopping movement of said turret when an aperture is at said crimping station, and means for moving said ram member through said opening at the crimping station to raise a container into engagement with said die member and for lowering said ram member away from said die member and back to a position beneath said turret.

4. An apparatus for crimping an upstanding flange of a container into engagement with a cover seated on a horizontal peripheral lip of the container comprising a rotatable turret having a plurality of circumferentially spaced pocket-like apertures each adapted to receive a container to be crimped, a crimping station including a stationary die member disposed above said turret and a ram member disposed below said turret in aligned relation with said die member, drive means for rotatably indexing said turret to move successive apertures to said crimping station and into alignment with said die and ram members, means for stopping movement of said turret when an aperture is at said crimping station, means for moving said ram member through an aperture of the turret at the crimping station to raise a container into engagement with said die member and for lowering said ram member away from said die member and back to a position beneath said turret, a delivery station disposed at an indexed position of said turret beyond said crimping station, and control means responsive to completion of the lowering of said ram member to cause said drive means to index said turret whereby an aperture having a crimped container therein is moved to said delivery station.

5. An apparatus for crimping an upstanding flange of a container into engagement with a cover seated on a horizontal peripheral lip of the container comprising a rotatable turret having a pocket-like aperture for receiving a container to be crimped, a crimping station including a stationary die member disposed above said turret and a vertically movable basket member disposed below said turret in aligned relation with said die member, drive means for rotating said turret to move an aperture having a container positioned therein to said crimping station and into alignment with said die and basket members, means for stopping movement of said turret when said aperture is at said crimping station, and means for engaging said basket member with the horizontal peripheral lip of the container, for moving said basket member through said aperture to raise the container into engagement with said die member and for lowering said basket member away from said die member and back to a position beneath said turret.

6. An apparatus for crimping an upstanding flange of a container into engagement with a cover seated on a horizontal peripheral lip of the container comprising a rotatable turret having a pocket-like aperture for receiving a container to be crimped, a crimping station including a stationary die member disposed above said turrent and a vertically movable basket member disposed below said turret in aligned relation with said die member, said basket member having a peripheral edge portion conforming in peripheral shape to the peripheral lip of said container, means for rotatably indexing said turret to move an aperture having a container positioned therein to said crimping station and into alignment with said die and basket members, means for stopping movement of said turret when said aperture is at said crimping station, operating means for engaging said peripheral edge of said basket member with the horizontal peripheral lip of the container, for moving said basket member through said aperture to raise the container into engagement with said die member and for lowering said basket member back to a position beneath said turret, and control means actuated by said turret upon arrival of said aperture at said crimping station for actuating said operating means.

7. An apparatus for crimping an upstanding flange of a container into engagement with a cover seated on a horizontal peripheral lip of the container comprising a rotatable turret having a plurality of pocket-like apertures each adapted to receive a container to be crimped, a crimping station including a stationary die member disposed above said turret and a vertically movable basket member disposed below said turret in aligned relation with said die member, drive means for rotatably indexing said turret to move successive apertures to said crimping station and into alignment with said die and basket members, means for stopping movement of said turret when an aperture is at said crimping station, operating means for engaging said basket member with the horizontal peripheral lip of the container, for moving said basket member through said aperture to raise the container into engagement with said die member and for lowering said basket member away from said die member, control means actuated by said turret upon arrived of an aperture at said crimping station for actuating said operating means, a delivery station disposed at an indexed position of said turret beyond said crimping station, and control means responsive to completion of the lowering of said basket member to cause said drive means to index said turret whereby an aperture having a crimped container therein is moved to said delivery station.

8. An apparatus for crimping an upstanding flange of a container into engagement with a cover seated on a horizontal peripheral lip of the container comprising a rotatable turret having a plurality of pocket-like apertures each adapted to receive a container to be crimped, a crimping station including a stationary die member disposed above said turret and a vertically movable basket member disposed below said turret in aligned relation with said die member, drive means for rotatably indexing said turret to move successive apertures to said crimping station and into alignment with said die and basket members, control means actuated by said turret as said turret approaches said crimping station to cause deceleration of said drive means and of said turret, means for stopping movement of said turret when an aperture is at said crimping station, operating means for moving said basket member through said aperture to raise the container into engagement with said die member, and for lowering said basket member away from said die member, control means actuated by said turret upon arrival of an aperture at said crimping station for actuating said operating means, a delivery station disposed at an indexed position of said turret beyond said crimping station, and control means responsive to completion of the lowering of said basket member to cause said drive means to index said turret whereby an aperture having a crimped container therein is moved to said delivery station.

9. An apparatus for crimping an upstanding flange of a container into engagement with a cover seated on a horizontal peripheral lip of the container comprising a rotatable turret having a pocket-like aperture for receiving a container to be crimped, a crimping station including a stationary die member disposed above said turret and a ram member disposed below said turret in aligned relation with said die member, operating means for raising said ram member to raise the container into engagement with said die member and for subsequently lowering said ram member away from said die member, fluid motor means for rotating said turret to move an aperture having a container therein to said crimping station and into alignment with said die and ram members, control means actuated by said turret as said aperture approaches said crimping station for causing restriction of fluid flow through said fluid motor to thereby decelerate said turret, means for stopping movement of said turret when said aperture reaches said crimping station, and control means actuated by arrival of said turret at said crimping station for actuating said operating means.

References Cited in the file of this patent

UNITED STATES PATENTS

| | | |
|---|---|---|
| 1,406,703 | Townsend | Feb. 14, 1922 |
| 1,796,075 | Blixt | Mar. 10, 1931 |